United States Patent
Nam et al.

(10) Patent No.: US 12,032,838 B2
(45) Date of Patent: Jul. 9, 2024

(54) MEMORY DEVICE AND OPERATION METHOD THEREOF

(71) Applicant: SAMSUNG ELECTRONICS CO., LTD., Suwon-si (KR)

(72) Inventors: Yoojin Nam, Suwon-si (KR); Woongdai Kang, Seongnam-si (KR); Seung-Jun Lee, Hwaseong-si (KR); Dongyeong Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/721,450

(22) Filed: Apr. 15, 2022

(65) Prior Publication Data
US 2023/0045263 A1 Feb. 9, 2023

(30) Foreign Application Priority Data
Aug. 6, 2021 (KR) .................. 10-2021-0103749

(51) Int. Cl.
*G06F 3/06* (2006.01)
(52) U.S. Cl.
CPC .......... *G06F 3/0632* (2013.01); *G06F 3/0625* (2013.01); *G06F 3/0679* (2013.01)
(58) Field of Classification Search
CPC .... G06F 3/0632; G06F 3/0679; G06F 3/0625; G06F 3/06
See application file for complete search history.

(56) References Cited

U.S. PATENT DOCUMENTS

| | | | |
|---|---|---|---|
| 5,740,118 A | 4/1998 | Sato et al. | |
| 6,735,142 B1* | 5/2004 | Oh | G11C 7/22 327/143 |
| 7,385,858 B2 | 6/2008 | Oh | |
| 9,396,784 B2 | 7/2016 | Cox et al. | |
| 10,304,501 B1 | 5/2019 | Pardeik et al. | |
| 10,339,995 B2 | 7/2019 | Do et al. | |
| 2014/0149770 A1* | 5/2014 | Ahmad | G06F 1/3287 713/323 |
| 2015/0089261 A1* | 3/2015 | Segawa | G06F 1/324 713/323 |

(Continued)

FOREIGN PATENT DOCUMENTS

KR 10-2008-0045515 A 5/2008

OTHER PUBLICATIONS

H.-W. Lee et al., "A 1.6 V 1.4 Gbp/s/pin Consumer DRAM With Self-Dynamic Voltage Scaling Technique in 44 nm CMOS Technology," in IEEE Journal of Solid-State Circuits, vol. 47, No. 1, pp. 131-140, Jan. 2012.*

(Continued)

*Primary Examiner* — Pierre Michel Bataille
(74) *Attorney, Agent, or Firm* — Fish & Richardson P.C.

(57) ABSTRACT

Disclosed is an operation method of a memory device which performs a self-refresh operation. The method includes receiving a deep-sleep mode enter command from a memory controller, changing a magnitude of an internal voltage of the memory device from a first voltage to a second voltage smaller than the first voltage, in response to the deep-sleep mode enter command, and entering a self-refresh mode under control of the memory controller, and the internal voltage is maintained at the second voltage during the self-refresh mode.

18 Claims, 11 Drawing Sheets

(56) References Cited

U.S. PATENT DOCUMENTS

| | | | |
|---|---|---|---|
| 2016/0224272 A1 | 8/2016 | Kim | |
| 2018/0121124 A1* | 5/2018 | Choi | G11C 11/4074 |
| 2018/0249005 A1* | 8/2018 | Dowlatkhah | H04M 3/42059 |
| 2020/0057485 A1* | 2/2020 | Chiang | G06F 1/28 |
| 2020/0211616 A1* | 7/2020 | Kim | G11C 5/145 |
| 2020/0258567 A1* | 8/2020 | Lim | G11C 11/40626 |
| 2021/0373648 A1* | 12/2021 | Nam | G06F 1/3296 |
| 2022/0172772 A1* | 6/2022 | Lee | G11C 7/04 |
| 2022/0172774 A1* | 6/2022 | Kim | G11C 11/4074 |

OTHER PUBLICATIONS

S.-S. Pyo et al., "A 0.65V embedded SDRAM with smart boosting and power management in a 45nm CMOS technology," Proceedings of the IEEE 2012 Custom Integrated Circuits Conference, San Jose, CA, USA, 2012, pp. 1-4.*

S. Tomishima et al., "A 1.0-V 230-MHz column access embedded DRAM for portable MPEG applications," in IEEE Journal of Solid-State Circuits, vol. 36, No. 11, pp. 1728-1737, Nov. 2001.*

T. Yamagata, S. Tomishima, M. Tsukude, T. Tsuruda, Y. Hashizume and K. Arimoto, "Low voltage circuit design techniques for battery-operated and/or giga-scale DRAMs," in IEEE Journal of Solid-State Circuits, vol. 30, No. 11, pp. 1183-1188, Nov. 1995.*

K.-S. Ha et al., "23.1 A 7.5Gb/s/pin LPDDR5 SDRAM With WCK Clocking and Non-Target ODT for High Speed and With DVFS, Internal Data Copy, and Deep-Sleep Mode for Low Power," 2019 IEEE International Solid-State Circuits Conference—(ISSCC), San Francisco, CA, USA, 2019, pp. 378-380.*

Y. Riho and K. Nakazato, "Partial Access Mode: New Method for Reducing Power Consumption of Dynamic Random Access Memory," in IEEE Transactions on Very Large Scale Integration (VLSI) Systems, vol. 22, No. 7, pp. 1461-1469, Jul. 2014.*

* cited by examiner

MEMORY DEVICE AND OPERATION METHOD THEREOF

CROSS-REFERENCE TO RELATED APPLICATION

This application claims priority under 35 U.S.C. § 119 to Korean Patent Application No. 10-2021-0103749 filed on Aug. 6, 2021, in the Korean Intellectual Property Office, the disclosure of which is incorporated by reference herein in its entirety.

BACKGROUND

1. Field

Embodiments relate to a semiconductor memory, and more particularly, relate to a memory device and an operation method thereof.

2. Description of the Related Art

A semiconductor memory device may be classified as a volatile memory, which loses data stored therein when a power supply is turned off, such as a dynamic random access memory (DRAM) or a static RAM (SRAM), or a nonvolatile memory, which retains data stored therein even when a power supply is turned off, such as a flash memory, a phase-change RAM (PRAM), a magnetic RAM (MRAM), or resistive RAM (ReRAM), or a ferroelectric random access memory (FRAM).

Among the above memories, the DRAM stores data by charging a memory cell. However, charges stored in the memory cell of the DRAM may leak out over time. Accordingly, to maintain charges (or data) stored in the memory cell of the DRAM, the DRAM uses a refresh operation of again charging charges. In particular, a refresh operation that is performed by an internal counter of the DRAM without an external command is called a "self-refresh operation".

SUMMARY

According to an embodiment, an operation method of a memory device which performs a self-refresh operation may include receiving a deep-sleep mode enter command from a memory controller, changing a magnitude of an internal voltage of the memory device from a first voltage to a second voltage smaller than the first voltage, in response to the deep-sleep mode enter command, and entering a self-refresh mode under control of the memory controller, and the internal voltage may be maintained at the second voltage during the self-refresh mode.

According to an embodiment, a memory device may include a memory cell array that includes a plurality of memory cells, a control logic circuit that activates a voltage reduction request signal in response to a deep-sleep mode enter command received from an external device, a power supply circuit that changes an internal voltage from a first voltage to a second voltage smaller than the first voltage in response to the activated voltage reduction request signal, and a self-refresh logic circuit that controls a self-refresh operation on the memory cells based on the internal voltage of the second voltage.

According to an embodiment, an operation method of a memory device which performs a self-refresh operation may include receiving a self-refresh mode enter command from a memory controller, in response to the self-refresh mode enter command, entering a self-refresh mode and changing a magnitude of an internal voltage of the memory device from a first voltage to a second voltage smaller than the first voltage, receiving a self-refresh mode exit command from the memory controller, and changing the magnitude of the internal voltage of the memory device from the second voltage to the first voltage, in response to the self-refresh mode exit command, and the internal voltage may be maintained at the second voltage during the self-refresh mode.

BRIEF DESCRIPTION OF THE FIGURES

Features will become apparent to those of skill in the art by describing in detail example embodiments with reference to the attached drawings in which.

DETAILED DESCRIPTION

Figure 1:
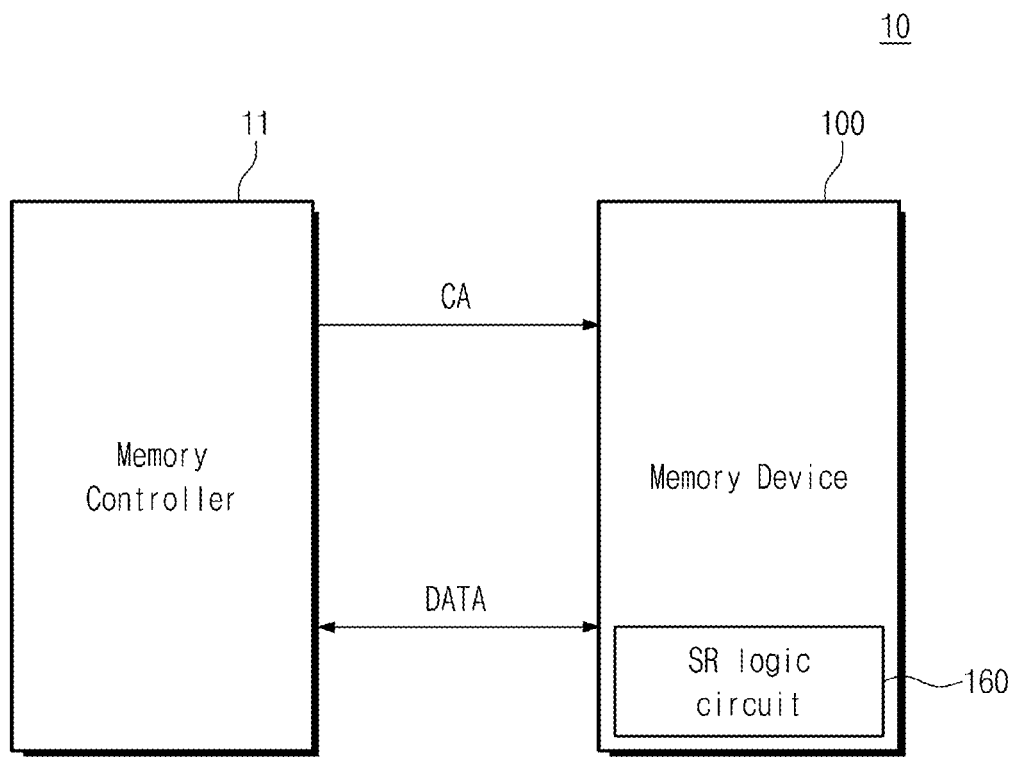
FIG. 1 is a block diagram illustrating a memory system according to an example embodiment.

FIG. 1 is a block diagram illustrating a memory system according to an example embodiment.

Referring to FIG. 1, a memory system 10 may include a memory controller 11 and a memory device 100.

Below, it is assumed, merely by way of example, that the memory device 100 is a dynamic random access memory (DRAM) and the memory controller 11 and the memory device 100 communicate with each other based on a double data rate (DDR) interface. However, this may be varied, e.g., the memory device 100 may be one of various memory devices such as a static random access memory (SRAM), a synchronous DRAM (SDRAM), a magnetic RAM (MRAM), a ferroelectric RAM (FRAM), a resistive RAM (ReRAM), and a phase-change RAM (PRAM), and the memory controller 11 and the memory device 100 may communicate with each other based on one of various interfaces such as a low power double data rate (LPDDR) interface, a universal serial bus (USB) interface, a multimedia card (MMC) interface, a peripheral component interconnect (PCI) interface, a peripheral component interconnect express (PCI-e) interface, an advanced technology attachment (ATA) interface, a serial ATA (SATA) interface, a parallel ATA (PATA) interface, a small computer system interface (SCSI), and an enhanced small disk interface (ESDI).

The memory controller 11 may store data "DATA" in the memory device 100 or may read the data "DATA" stored in the memory device 100. To manage a read operation or a write operation of the memory device 100, the memory controller 11 may send a command/address CA to the memory device 100.

In an example embodiment, the command/address CA may include command CMD or address ADDR information.

The command CMD may include a self-refresh mode enter command SRE, a self-refresh mode exit command SRX, a power-down mode enter command PDE, a power-down mode exit command PDX, a deep-sleep mode enter command DSM, or the like.

The address ADDR may include a row address, a column address, a bank address, or the like.

However, these may be varied, e.g., the command/address CA may be implemented to include the command CMD and the address ADDR in various different forms.

In an example embodiment, the command and address information included in the command/address CA may be determined by a combination of various signals. The various signals may include signals that are provided from the memory controller 11, such as command/address input signals CA0 to CA6 and clock signals CK_t and CK_c (not shown in FIG. 1). However, this may be varied, e.g., a command or an address may be defined by an input of other various signals.

Under control of the memory controller 11, the memory device 100 may store the data "DATA" provided from the memory controller 11, or may provide the stored data "DATA" to the memory controller 11.

The memory device 100 may be controlled by the command/address CA provided from the memory controller 11. For example, the memory device 100 may enter a self-refresh mode from an idle state IDLE in response to the self-refresh mode enter command SRE, and may enter the idle state IDLE from the self-refresh mode in response to the self-refresh mode exit command SRX. However, this may be varied, e.g., the memory device 100 may be variously controlled by other commands. Examples in which the memory device 100 is controlled by various commands will be described in detail with reference to FIG. 4.

In an example embodiment, the memory device 100 may include a self-refresh logic circuit 160. The self-refresh logic circuit 160 may control a self-refresh operation of the memory device 100 in response to the command/address CA provided from the memory controller 11. For example, the self-refresh logic circuit 160 may control the memory device 100 in response to the self-refresh mode enter command SRE such that the self-refresh operation is performed. The self-refresh logic circuit 160 may control the memory device 100 in response to the self-refresh mode exit command SRX such that the self-refresh operation is terminated.

In an example embodiment, a magnitude of a voltage that is used in the self-refresh logic circuit 160 may be different or may change depending on the command/address CA provided from the memory controller 11, in which case, power consumption of the memory device 100 may be reduced. This and other operations of the self-refresh logic circuit 160 will be described in detail below.

Figure 2:
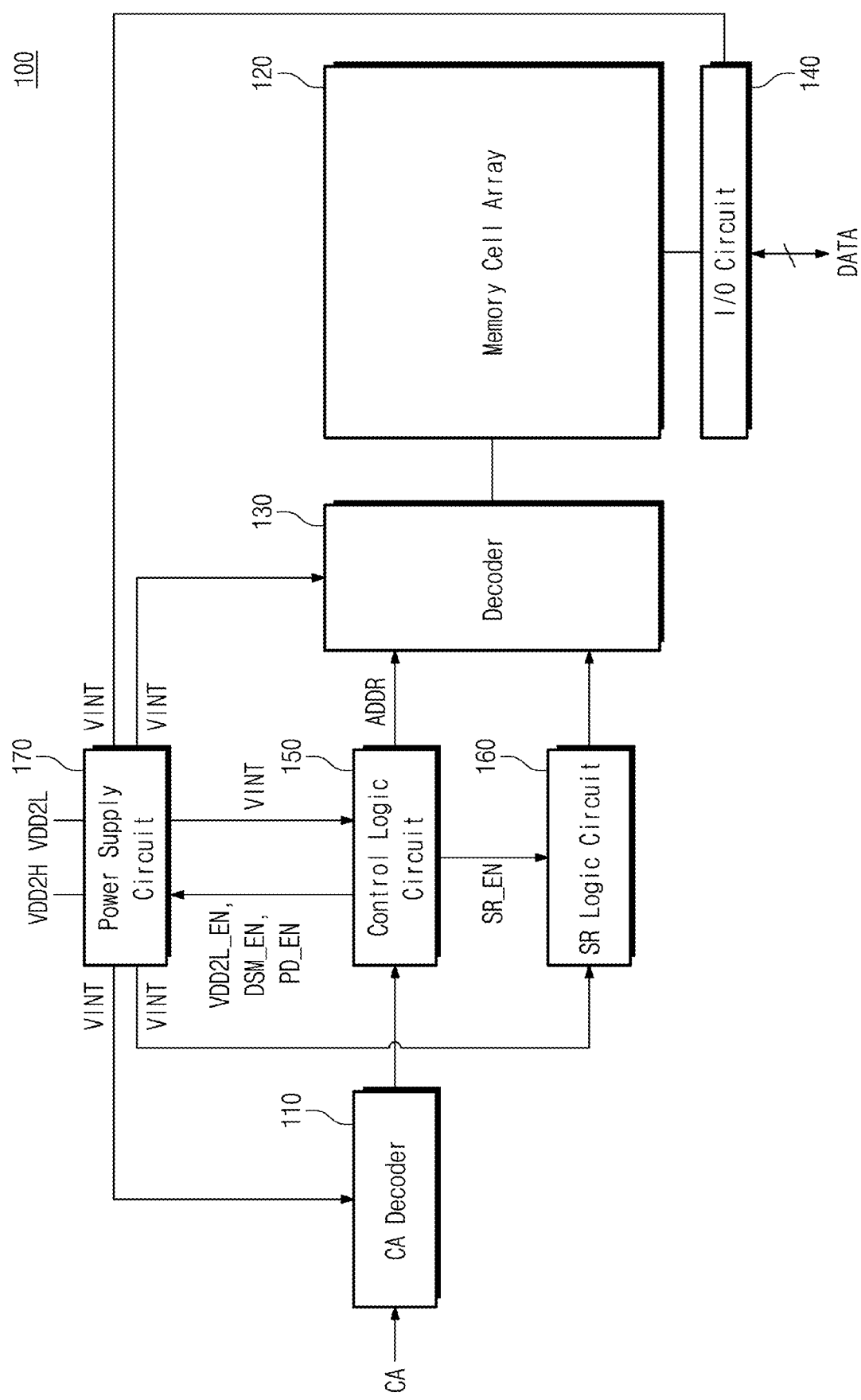
FIG. 2 is a block diagram illustrating a memory device of FIG. 1.

FIG. 2 is a block diagram illustrating a memory device of FIG. 1.

Referring to FIGS. 1 and 2, the memory device 100 may include a command/address decoder 110, a memory cell array 120, the self-refresh logic circuit 160, a control logic circuit 150, a power supply circuit 170, a decoder 130, and an input/output circuit 140.

The command/address decoder 110 may receive the command/address CA from the memory controller 11, and may decode the received command/address CA.

In an example embodiment, the command/address CA may include the command CMD such as the self-refresh mode enter command SRE, the self-refresh mode exit command SRX, the power-down mode enter command PDE, the power-down mode exit command PDX, and/or the deep-sleep mode enter command DSM.

The command/address CA decoded by the command/address decoder 110 may be transferred to the control logic circuit 150.

The memory cell array 120 may include a plurality of memory cells. The memory cell array 120 may be connected with the decoder 130 and the input/output circuit 140. A configuration and an operation of the memory cell array 120 will be described in detail with reference to FIG. 3.

The decoder 130 may control the plurality of memory cells included in the memory cell array 120. The decoder 130 may control the plurality of memory cells based on information (e.g., a decoding result) that the decoder 130 receives from the command/address decoder 110.

The input/output circuit 140 may be configured to write data in the plurality of memory cells included in the memory cell array 120, or to output data stored in the plurality of memory cells included in the memory cell array 120.

The control logic circuit 150 may control components of the memory device 100 in response to the command CMD and the address ADDR decoded by the command/address decoder 110. For example, when the command CMD received from the command/address decoder 110 is a read or write command, the control logic circuit 150 may control the decoder 130 and the input/output circuit 140 such that data of memory cells corresponding to the received address ADDR are input/output.

The control logic circuit 150 may output a self-refresh control signal SR_EN to the self-refresh logic circuit 160 in response to the command CMD and the address ADDR decoded by the command/address decoder 110.

The control logic circuit 150 may control the power supply circuit 170 in response to the command CMD and the address ADDR decoded by the command/address decoder 110. For example, the control logic circuit 150 may output a deep-sleep mode control signal DSM_EN to the power supply circuit 170 in response to the deep-sleep mode enter command DSM. The control logic circuit 150 may output a power-down mode control signal PD_EN to the power supply circuit 170 in response to the power-down mode enter command PDE.

The control logic circuit 150 may output a voltage reduction request signal VDD2L_EN to the power supply circuit 170. For example, activation of the voltage reduction request signal VDD2L_EN may request or command a decrease in a magnitude of a voltage that is provided to components of the memory device 100.

In an example embodiment, the control logic circuit 150 may activate the voltage reduction request signal VDD2L_EN in a time period before receiving the self-refresh mode exit command SRX, after the memory device 100 receives the deep-sleep mode enter command DSM. However, this may be varied. The voltage reduction request signal VDD2L_EN may be activated in various states or modes in which the self-refresh operation is performed. For example, the control logic circuit 150 may activate the voltage reduction request signal VDD2L_EN until the memory device 100 receives the self-refresh mode exit command SRX after receiving the power-down mode enter command PDE, or until the memory device 100 receives the self-refresh mode exit command SRX after receiving the self-refresh mode enter command SRE. Various embodiments in which the control logic circuit 150 activates the voltage reduction request signal VDD2L_EN depending on an operation mode of the memory device 100 will be described in detail with reference to FIGS. 5 and 7 to 11.

The self-refresh logic circuit 160 may perform the self-refresh operation on the memory cell array 120 through the decoder 130 in response to the received self-refresh control signal SR_EN. For example, the self-refresh logic circuit 160 may control the decoder 130 such that information stored in memory cells of the memory cell array 120 is read and amplified through a sense amplifier (not illustrated) and is then again stored in the memory cells. A method in which the self-refresh logic circuit 160 performs the self-refresh operation on the memory cell array 120 will be described in detail with reference to FIG. 3.

The power supply circuit 170 may be supplied with voltages of two or more magnitudes from the outside of the memory device 100. For example, the power supply circuit 170 may be supplied with a first voltage VDD2H and a second voltage VDD2L, the magnitude of which is smaller than that of the first voltage VDD2H, from the outside of the memory device 100. In this case, the first voltage VDD2H may be a voltage that is used when the memory device 100 performs a normal operation, and the second voltage VDD2L may be a lower voltage that is used when the memory device 100 performs a power saving operation.

In an example embodiment, the power supply circuit 170 may receive the first voltage VDD2H and the second voltage VDD2L from the outside of the memory device 100. In an example embodiment, the power supply circuit 170 may receive the first voltage VDD2H and the second voltage VDD2L from the outside of the memory device 100 through different power lines.

In an example embodiment, a level of the first voltage VDD2H may range from 1.01 V to 1.12 V, and a level of the second voltage VDD2L may range from 0.87 V to 0.97 V.

In an example embodiment, the first voltage VDD2H may have a level of 1.05 V, and the second voltage VDD2L may have a level of 0.9 V.

In an example embodiment, unlike the above description, the power supply circuit 170 may be supplied with the first voltage VDD2H and the second voltage VDD2L from an internal component of the memory device 100. In an example embodiment, the power supply circuit 170 may be supplied with the first voltage VDD2H and the second voltage VDD2L from a voltage converting circuit (not illustrated) included in the memory device 100.

In an example embodiment, the first voltage VDD2H and the second voltage VDD2L may be voltages that are used to implement a dynamic voltage and frequency scaling core (DVFSC) mode of the memory device 100. For example, in the implementation of the DVFSC mode of the memory device 100, the first voltage VDD2H may be a voltage that is used for a high-speed operation of the memory device 100, and the second voltage VDD2L may be a voltage that is used for a low-speed operation of the memory device 100. However, an example embodiment may be varied relative to the case where the first voltage VDD2H and the second voltage VDD2L are voltages used to implement the DVFSC mode of the memory device 100. For example, the first voltage VDD2H and the second voltage VDD2L may be various voltages that are supplied from the inside or outside of the memory device 100.

The power supply circuit 170 may provide an internal voltage VINT to each of components (e.g., the command/address decoder 110, the control logic circuit 150, the self-refresh logic circuit 160, the decoder 130, and the input/output circuit 140) of the memory device 100. The internal voltage VINT may be used to perform an operation of each of the components of the memory device 100 (e.g., as a power supply voltage).

In an example embodiment, the power supply circuit 170 may be implemented to select one of the first voltage VDD2H and the second voltage VDD2L supplied from the outside of the memory device 100, as the internal voltage VINT to be provided to each of the components of the memory device 100. That is, the power supply circuit 170 may selectively supply the first voltage VDD2H or the second voltage VDD2L as the internal voltage VINT.

In an example embodiment, depending on a power used for an operation or a function of the components of the memory device 100, the power supply circuit 170 may not provide the internal voltage VINT to at least one of the components of the memory device 100. For example, the power supply circuit 170 may not provide the internal voltage VINT to the input/output circuit 140 in response to the deep-sleep mode control signal DSM_EN or the power-down mode control signal PD_EN received from the control logic circuit 150. However, this may be varied, e.g., the power supply circuit 170 may not supply the internal voltage VINT to other selected component(s) of the memory device 100 in response to the deep-sleep mode control signal DSM_EN or the power-down mode control signal PD_EN.

In an example embodiment, a magnitude of the internal voltage VINT that the power supply circuit 170 provides to the components of the memory device 100 may change depending on a power used for an operation or a function of the components of the memory device 100. For example, in response to the voltage reduction request signal VDD2L_EN received from the control logic circuit 150 being activated, the power supply circuit 170 may decrease the magnitude of the internal voltage VINT that is supplied to the components of the memory device 100 (e.g., decreased from the first voltage VDD2H to the second voltage VDD2L). As another example, in response to the voltage reduction request signal VDD2L_EN received from the control logic circuit 150 being deactivated, the power supply circuit 170 may increase the magnitude of the internal voltage VINT (e.g., increase from the second voltage VDD2L to the first voltage VDD2H).

In an example embodiment, the power supply circuit 170 may be implemented to select one of the first voltage VDD2H and the second voltage VDD2L in response to the voltage reduction request signal VDD2L_EN, and thus, the magnitude of the internal voltage VINT may be controlled. A configuration and an operation in which the power supply circuit 170 controls the magnitude of the internal voltage VINT in response to the voltage reduction request signal VDD2L_EN will be described in detail with reference to FIG. 6.

Figure 3:
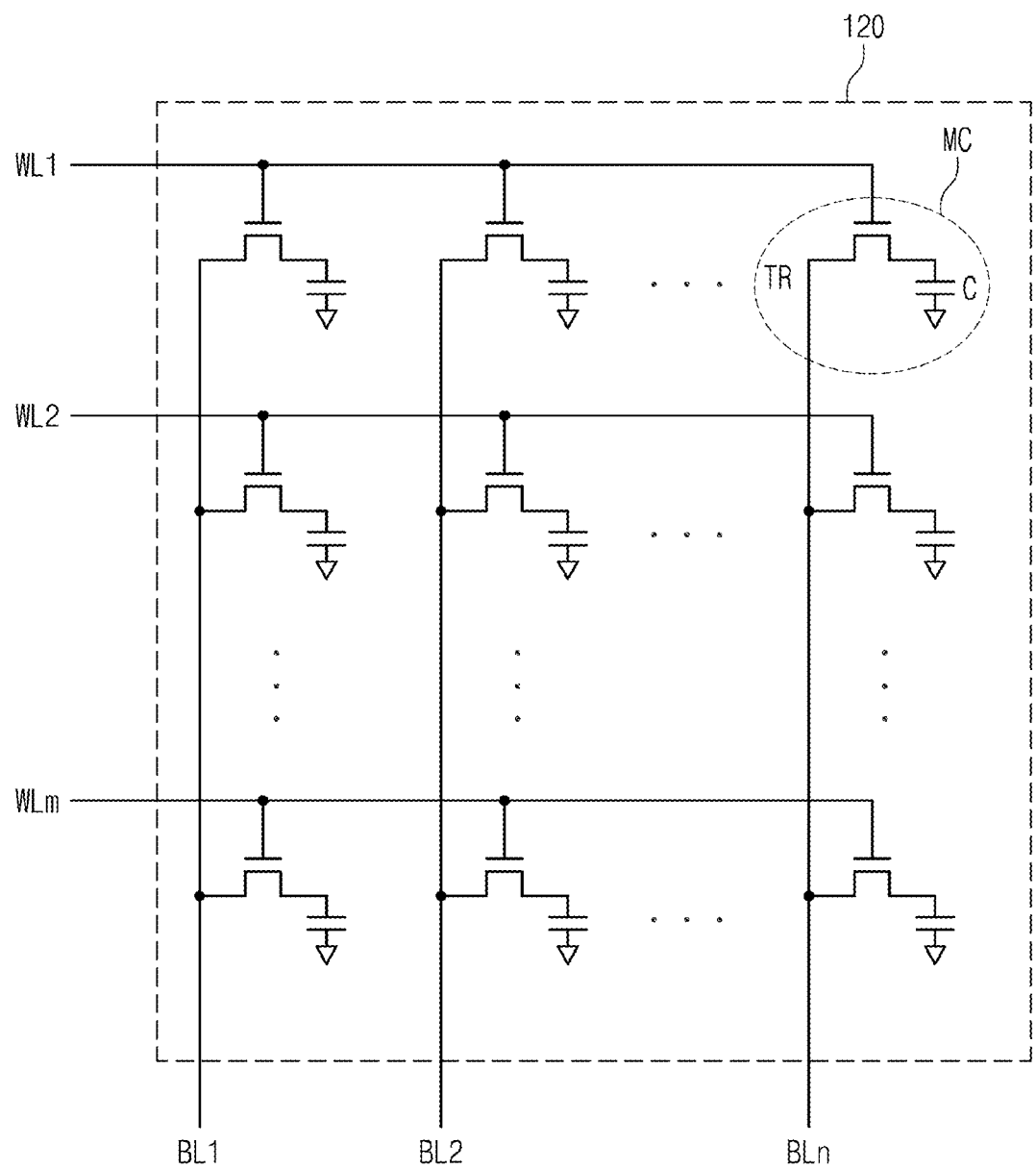
FIG. 3 is a circuit diagram illustrating a memory cell array illustrated in FIG. 2.

FIG. 3 is a circuit diagram illustrating a memory cell array illustrated in FIG. 2.

For convenience of description, some memory cells are illustrated in FIG. 3, but the number of memory cells may be varied.

Referring to FIGS. 2 and 3, the memory cell array 120 may include a plurality of memory cells MC. Each of the plurality of memory cells MC may include an access transistor TR and a storage capacitor "C". First ends of the access transistors TR of the memory cells MC are connected with a plurality of bit lines BL1 to BLn, and second ends thereof are connected with the corresponding storage capacitors "C". Gates of the access transistors TR of the memory cells MC are connected with a plurality of word lines WL1 to WLm.

Charges may be stored in each storage capacitor "C" through the corresponding bit line. A self-refresh operation of updating charges stored in each storage capacitor "C" may be performed depending on a finite data retention characteristic in which charges stored in each storage capacitor "C" is leaked out over time.

In detail, under control of the self-refresh logic circuit 160, voltages may be supplied to the word lines WL1 to WLm every given time period through the decoder 130 such that charges stored in memory cells connected with the word lines WL1 to WLm are sensed and amplified. For example, a sense amplifier (not illustrated) may sense data stored in the memory cells MC through the plurality of bit line BL1 to BLn, and may amplify the sensed data so as to be rewritten in corresponding memory cells.

Figure 4:
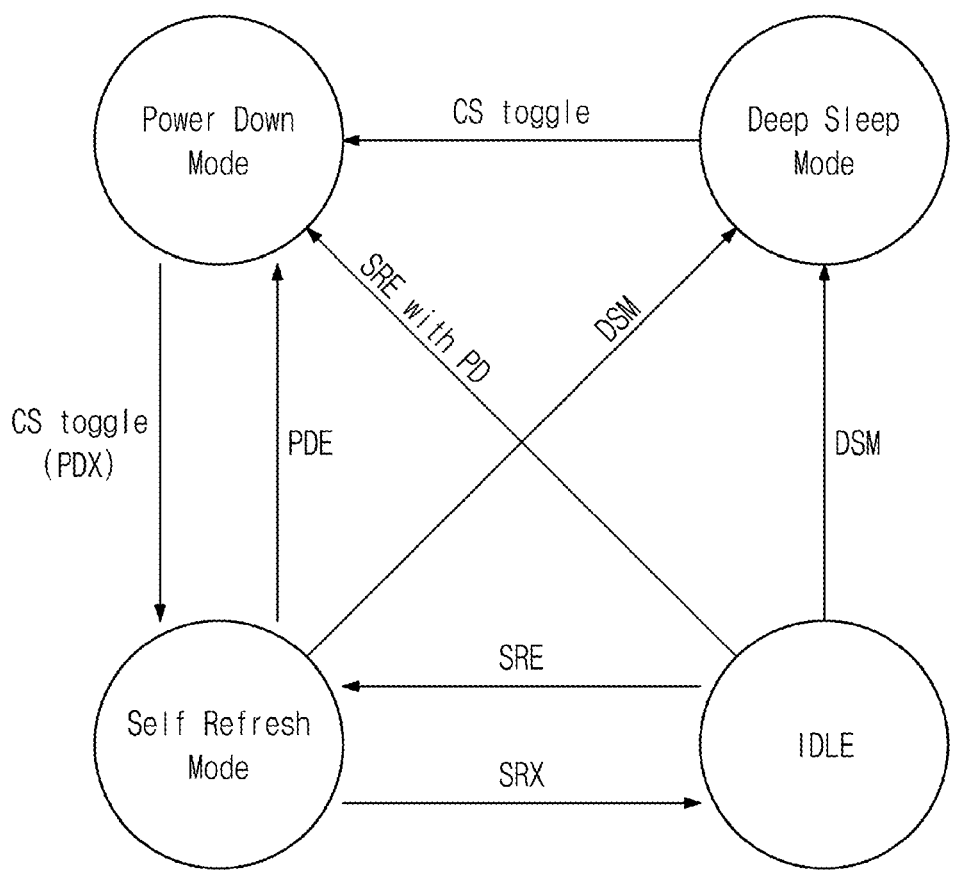
FIG. 4 is a state diagram according to each operation of a memory device of FIG. 2.

FIG. 4 is a state diagram according to each operation of a memory device of FIG. 2.

Transition sequences between various states or modes of a memory device, which are illustrated in FIG. 4, may be performed in response to the command/address CA received from the memory controller 11 of FIG. 1. For brevity of drawing and convenience of description, descriptions of components that are unnecessary to describe the present example embodiment may be omitted.

Referring to FIGS. 2 and 4, an operation state or an operation mode of the memory device 100 may include an idle state IDLE, a self-refresh mode, a deep-sleep mode, and a power-down mode.

In an example embodiment, the idle state IDLE may mean a state in which all banks are pre-charged. The memory device 100 in the idle state IDLE may enter a mode (not illustrated) of performing a read or write operation after receiving an active command (not illustrated).

In an example embodiment, the self-refresh mode may indicate a mode in which the memory device 100 performs a refresh operation on the memory cells MC until the self-refresh mode exit command SRX is received.

In an example embodiment, each of the power-down mode and the deep-sleep mode may be an operation mode of performing the self-refresh operation with less power than the self-refresh mode. For example, each of the power-down mode and the deep-sleep mode may be an operation mode that is provided to reduce power consumption while the self-refresh operation of the memory device 100 is performed.

In an example embodiment, the deep-sleep mode may indicate a mode in which remaining (or most) components of the memory device 100 other than components used for the self-refresh operation are turned off, for a power saving operation of the memory device 100.

In an example embodiment, the power-down mode may indicate a mode in which some of the components of the memory device 100 are turned off for the power saving operation of the memory device 100.

Referring to FIGS. 2 to 4, the memory device 100 according to the present example embodiment may enter the self-refresh mode from the idle state IDLE in response to the self-refresh mode enter command SRE. As described above, the self-refresh mode may indicate a mode in which the memory device 100 performs a refresh operation on the memory cells MC until the self-refresh mode exit command SRX is received.

In an example embodiment, the power consumption of the memory device 100 that performs the self-refresh operation may be reduced. For example, the amount of power that is consumed after the memory device 100 enters the self-refresh mode may be reduced compared to the case where the components of the memory device 100 do not perform the self-refresh operation (e.g., the case where a read or write operation is performed). In this case, a magnitude of the internal voltage VINT of the memory device 100 may be decreased. An example embodiment in which the internal voltage VINT of the memory device 100 entering the self-refresh mode is decreased will be described in detail with reference to FIGS. 10 and 11.

The memory device 100 in the self-refresh mode may enter the deep-sleep mode in response to the deep-sleep mode enter command DSM. As described above, the deep-sleep mode may indicate a mode in which the remaining (or most) components of the memory device 100 other than components used for the self-refresh operation are turned off, for a power saving operation of the memory device 100. For example, when the memory device 100 operates in the deep-sleep mode, the power supply circuit 170 may block the internal voltage VINT that is provided to the input/output circuit 140. However, this may be varied, e.g., components of the memory device 100, which are to be turned off in the deep-sleep mode, may be variously selected.

Also, in an example embodiment, the memory device 100 in the idle state IDLE may enter the deep-sleep mode in response to the deep-sleep mode enter command DSM.

In an example embodiment, when the memory device 100 enters the deep-sleep mode, a magnitude of the internal voltage VINT that each of the components of the memory device 100 is provided with by the power supply circuit 170 may decrease (e.g., decrease from the first voltage VDD2H to the second voltage VDD2L). In this case, the decreased magnitude of the internal voltage VINT may be maintained until the self-refresh mode exit command SRX is input to the memory device 100. Accordingly, a memory device whose power consumption is reduced may be provided. An embodiment in which the magnitude of the internal voltage VINT (which is decreased when the deep-sleep mode enter command DSM is received) is maintained until the self-refresh mode exit command SRX is received will be described in detail with reference to FIGS. 5 and 7.

The memory device 100 in the deep-sleep mode may enter the power-down mode in response to a toggle of a chip select (CS) signal. The CS signal may be a signal constituting a command that is transmitted from the memory controller 11 for the purpose of controlling the memory device 100. As described above, the power-down mode may indicate a mode in which some of the components of the memory device 100 are turned off for the power saving operation of the memory device 100. For example, when the memory device 100 operates in the power-down mode, the power supply circuit 170 may block the internal voltage VINT that is provided to the input/output circuit 140. However, this may be varied, e.g., components of the memory device 100, which are to be turned off in the power-down mode, may be variously selected.

In an example embodiment, the memory device 100 in the idle state IDLE may enter the power-down mode in response to the power-down self-refresh mode enter command "SRE with PD".

In an example embodiment, the memory device 100 in the self-refresh mode may enter the power-down mode in response to the power-down mode enter command PDE.

The memory device 100 in the power-down mode may enter the self-refresh mode in response to the power-down mode exit command PDX. In an example embodiment, the power-down mode exit command PDX may be a command that is provided through a toggle of the CS signal.

In an example embodiment, when the memory device 100 enters the power-down mode, a magnitude of the internal voltage VINT may decrease (e.g., decrease from the first voltage VDD2H to the second voltage VDD2L). In this case, the decreased magnitude of the internal voltage VINT may be maintained until the self-refresh mode exit command SRX is input to the memory device 100. Accordingly, a memory device whose power consumption is reduced may be provided. An embodiment in which the magnitude of the internal voltage VINT (which is decreased when the memory device 100 enters the power-down mode) is maintained until the self-refresh mode exit command SRX is received will be described in detail with reference to FIGS. 8 and 9.

Figure 5:
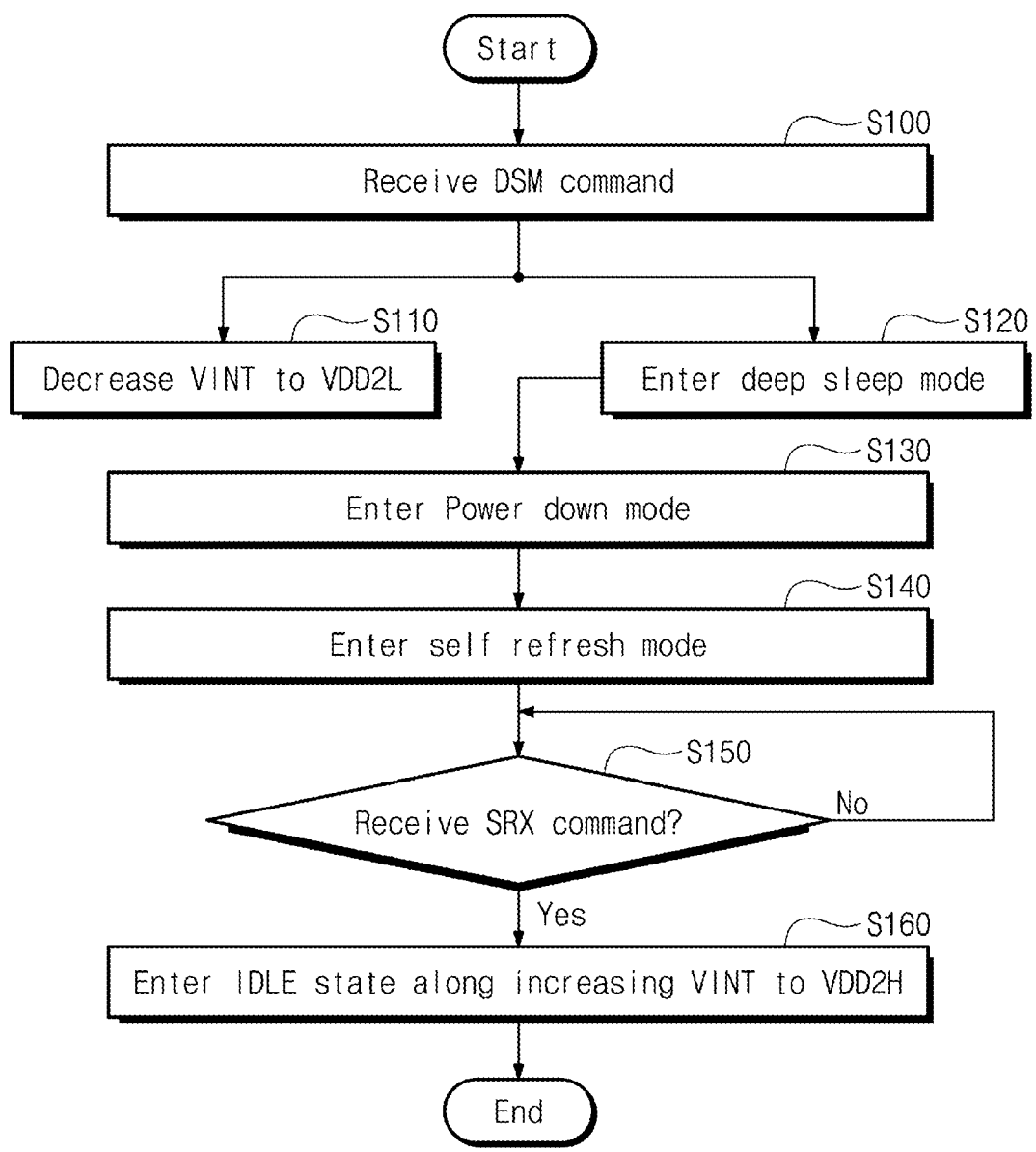
FIG. 5 is a flowchart illustrating an operation method of a memory device of FIG. 2.

FIG. 5 is a flowchart illustrating an operation method of a memory device of FIG. 2.

Below, an operation method of a memory device will be described with reference to FIGS. 2, 4, and 5. To make the explanation short and clear, it is assumed that the flowchart of FIG. 5 starts in the case where the memory device 100 of FIG. 2 is operating in the idle state IDLE or the self-refresh mode.

In operation S100, the memory device 100 may receive the deep-sleep mode enter command DSM. In this case, operation S110 and operation S120 may be performed in parallel regardless of whether the memory device 100 is in the idle state IDLE or the self-refresh mode.

In operation S110, the memory device 100 may decrease the internal voltage VINT from the first voltage VDD2H to the second voltage VDD2L. For example, the control logic circuit 150 of the memory device 100 may activate the voltage reduction request signal VDD2L_EN that is provided to the power supply circuit 170. In response to the voltage reduction request signal VDD2L_EN being activated, the power supply circuit 170 of the memory device 100 may change (reduce) the internal voltage VINT from the first voltage VDD2H to the second voltage VDD2L. However, in the case where the memory device 100 is operating in a state where the internal voltage VINT of the memory device 100 is already the second voltage VDD2L, operation S110 may not be performed.

In operation S120, the memory device 100 may enter the deep-sleep mode. In this case, most of the remaining components of the memory device 100 other than components used for the self-refresh operation may be turned off. For example, the power supply circuit 170 of the memory device 100 may block the internal voltage VINT that is provided to the input/output circuit 140.

In operation S130, the memory device 100 may enter the power-down mode in response to a toggle of a chip select (CS) signal. In this case, some of the components of the memory device 100 may be turned off. In an example embodiment, components turned off in operation S120 may be same as or different from those turned off in operation S130.

In operation S140, the memory device 100 may enter the self-refresh mode in response to the power-down mode exit command PDX. In an example embodiment, the power-down mode exit command PDX may be a command that is provided through a toggle of the CS signal.

In operation S150, the memory device 100 may determine whether the self-refresh mode exit command SRX is received. When the self-refresh mode exit command SRX is received, operation S160 may be performed. When the memory device 100 does not receive the self-refresh mode exit command SRX, the memory device 100 may operate by using the internal voltage VINT (e.g., the second voltage VDD2L) until the self-refresh mode exit command SRX is received. For example, when the memory device 100 does not receive the self-refresh mode exit command SRX, as in the above description given with reference to FIG. 4, the memory device 100 may operate in the self-refresh mode. That is, the memory device 100 may perform the self-refresh operation, and then, the memory device 100 may enter the deep-sleep mode in response to further receiving the deep-sleep mode enter command DSM or may enter the power-down mode in response to further receiving the power-down mode enter command PDE.

In operation S160, the memory device 100 may enter the idle state IDLE while increasing the internal voltage VINT to the first voltage VDD2H. For example, the control logic circuit 150 of the memory device 100 may deactivate the voltage reduction request signal VDD2L_EN that is provided to the power supply circuit 170. In response to the voltage reduction request signal VDD2L_EN being deactivated, the power supply circuit 170 of the memory device 100 may change, i.e., raise, the internal voltage VINT from the second voltage VDD2L to the first voltage VDD2H.

After operation S160, in an example embodiment, the memory device 100 may operate in the idle state IDLE. In this case, as in the above description given with reference to FIG. 4, the memory device 100 may enter a read or write mode (not illustrated) after receiving an active command (not illustrated); the memory device 100 may enter the self-refresh mode in response to receiving the self-refresh mode enter command SRE; the memory device 100 may enter the deep-sleep mode in response to further receiving the deep-sleep mode enter command DSM; or, the memory device 100 may enter the power-down mode in response to further receiving the power-down self-refresh mode enter command "SRE with PD".

In an example embodiment, after operation S160, the memory device 100 that enters the idle state IDLE may again perform operation S100 to operation S160 after selectively performing entering the self-refresh mode.

Figure 6:
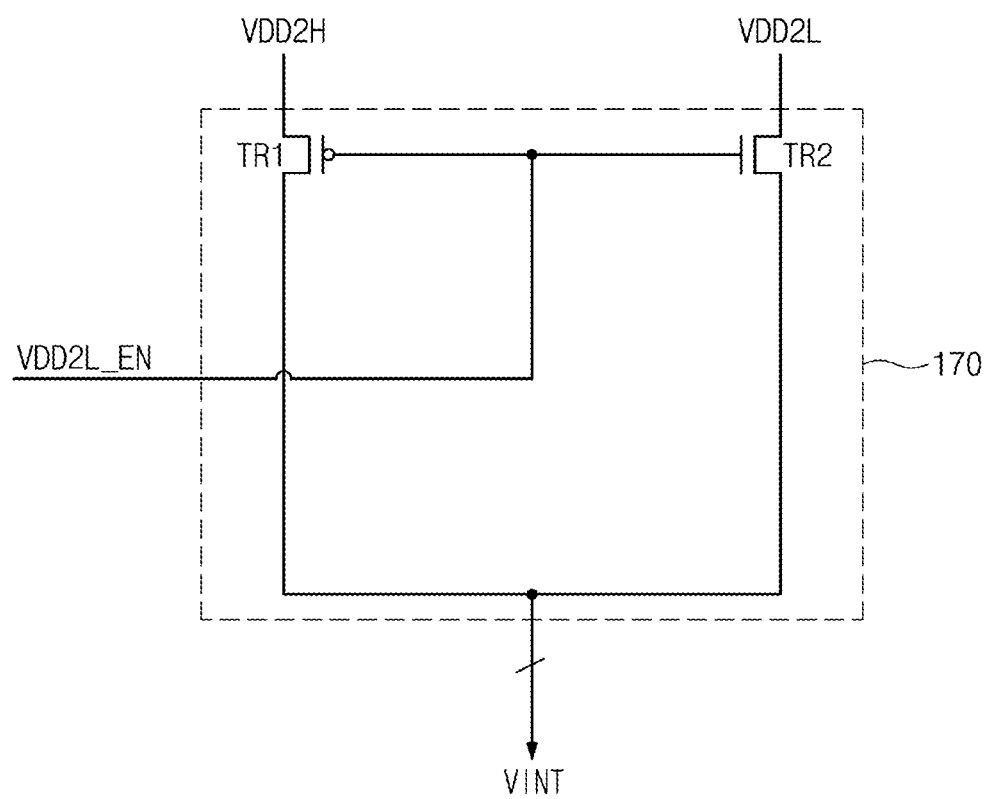
FIG. 6 is a circuit diagram illustrating a power supply circuit of FIG. 2.

FIG. 6 is a circuit diagram illustrating a power supply circuit of FIG. 2. Referring to FIGS. 2 and 6, the power supply circuit 170 may be provided with the first voltage VDD2H and the second voltage VDD2L from the outside, and may be provided with the voltage reduction request signal VDD2L_EN from the control logic circuit 150. The power supply circuit 170 may provide the internal voltages VINT to the remaining components of the memory device 100.

In detail, the power supply circuit 170 may include a first transistor TR1 and a second transistor TR2. The first transistor TR1 and the second transistor TR2 may perform a function of selecting and transferring the first voltage VDD2H or the second voltage VDD2L as the internal voltages VINT. For example, a first terminal of the first transistor TR1 may be provided with the first voltage VDD2H, and a gate terminal thereof may be provided with the voltage reduction request signal VDD2L_EN. When the voltage reduction request signal VDD2L_EN provided to the gate terminal of the first transistor TR1 is deactivated, the first voltage VDD2H may be provided to the remaining components of the memory device 100 as the internal voltage VINT through a second end of the first transistor TR1. As in the above description, in response to the voltage reduction request signal VDD2L_EN provided to a gate terminal of the second transistor TR2 being activated, the second transistor TR2 may provide the second voltage VDD2L to the remaining components of the memory device 100 as the internal voltage VINT.

By way of example, an example embodiment in which the first transistor TR1 is a P-channel metal oxide semiconductor (PMOS) transistor and the second transistor TR2 is an N-channel metal oxide semiconductor (NMOS) transistor is illustrated in FIG. 6, but this may be varied. For example, the power supply circuit 170 may perform a function of selectively transferring the first voltage VDD2H or the second voltage VDD2L as the internal voltage VINT to the remaining components of the memory device 100 depending on whether the voltage reduction request signal VDD2L_EN is activated. In an example embodiment, the power supply circuit 170 may determine whether to provide the internal voltage VINT to each of the remaining components of the memory device 100 in response to the deep-sleep mode control signal DSM_EN or the power-down mode control signal PD_EN.

Figure 7:
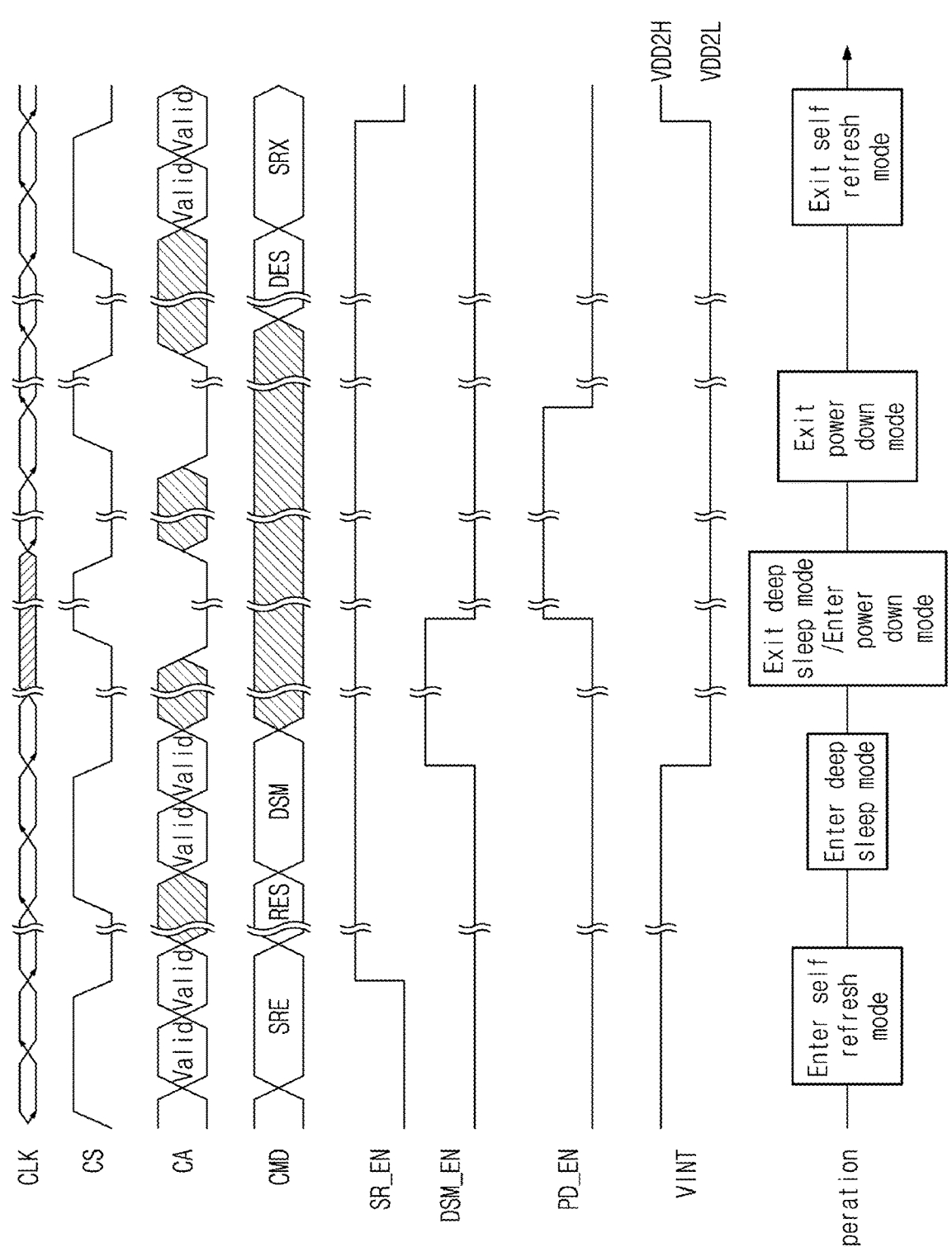
FIG. 7 is a timing diagram for describing an operation of a memory device of FIG. 2.

FIG. 7 is a timing diagram for describing an operation of a memory device of FIG. 2.

For brevity of drawing and convenience of description, an operation of the memory device 100 that operates from the idle state IDLE will be described with reference to FIGS. 2, 4, and 7 as an example. However, this may be varied, e.g., the description may be similarly applied to the memory device 100 that operates in the self-refresh mode.

Referring to FIG. 7, first, the memory device 100 in the idle state IDLE may receive the self-refresh mode enter command SRE from the memory controller 11 to enter the self-refresh mode. In this case, the control logic circuit 150 of the memory device 100 may output the self-refresh control signal SR_EN to the self-refresh logic circuit 160 in response to the self-refresh mode enter command SRE. The self-refresh logic circuit 160 may perform the self-refresh operation on the memory cells MC of the memory cell array 120 in response to the received self-refresh control signal SR_EN.

Afterwards, the memory device 100 in the self-refresh mode may receive the deep-sleep mode enter command DSM from the memory controller 11, and may enter the deep-sleep mode. In this case, a magnitude of the internal voltage VINT of the memory device 100 may decrease. For example, in response to the deep-sleep mode enter command DSM, the control logic circuit 150 of the memory device 100 may output the deep-sleep mode control signal DSM_EN to the power supply circuit 170, and may provide the activated voltage reduction request signal VDD2L_EN to the power supply circuit 170. The power supply circuit 170 may block the supply of the internal voltage VINT to some (e.g., the input/output circuit 140) of the components of the memory device 100 in response to the deep-sleep mode control signal DSM_EN. In response to the activated voltage reduction request signal VDD2L_EN, the power supply circuit 170 may decrease a magnitude of the internal voltage VINT of the memory device 100 to the second voltage VDD2L.

The memory device 100 operating in the deep-sleep mode may enter the power-down mode in response to the CS signal being toggled. In this case, under control of the control logic circuit 150, an output of the deep-sleep mode control signal DSM_EN may be blocked, and the power-down mode control signal PD_EN may be output.

In an example embodiment, the power supply circuit 170 may further block the supply of the internal voltage VINT to some (e.g., the input/output circuit 140) of the components of the memory device 100 or may release the blocked internal voltage(s) VINT. However, the magnitude of the internal voltage VINT of the memory device 100 may be maintained at the second voltage VDD2L.

The memory device 100 in the power-down mode may enter the self-refresh mode in response to the power-down mode exit command PDX. In an example embodiment, the power-down mode exit command PDX may be a command that is provided through a toggle of the CS signal. In this case, the control logic circuit 150 may block the output of the power-down mode control signal PD_EN to the power supply circuit 170 in response to the power-down mode exit command PDX. However, the magnitude of the internal voltage VINT of the memory device 100 may be maintained at the second voltage VDD2L.

In an example embodiment, the memory device 100 entering the self-refresh mode may continuously maintain the magnitude of the internal voltage VINT at the second voltage VDD2L. For example, until the self-refresh mode exit command SRX is received, the memory device 100 may enter the power-down mode when receiving the power-down mode enter command PDE, and may enter the deep-sleep mode when again receiving the deep-sleep mode enter command DSM. In this case, an operation of the memory device 100 may be performed in a state where the magnitude of the internal voltage VINT is maintained at the second voltage VDD2L.

The memory device 100 in the self-refresh mode may receive the self-refresh mode exit command SRX to enter the idle state IDLE. In this case, the control logic circuit 150 may block the output of the self-refresh control signal SR_EN to the self-refresh logic circuit 160 in response to the self-refresh mode exit command SRX. The self-refresh logic circuit 160 may stop performing the self-refresh operation in response to the self-refresh control signal SR_EN being blocked. The control logic circuit 150 may deactivate the voltage reduction request signal VDD2L_EN that is provided to the power supply circuit 170. In response to the voltage reduction request signal VDD2L_EN being deactivated, the power supply circuit 170 may change the internal voltage VINT that is supplied to the components of the memory device 100 to the first voltage VDD2H.

In an example embodiment, the memory device 100 in the idle state IDLE may receive the active command (not illustrated), and may perform the read or write operation. Alternatively, as in the above description given with reference to FIG. 2, the memory device 100 in the idle state IDLE may enter the deep-sleep mode, the self-refresh mode, or the power-down mode by receiving various commands. However, the memory device may operate in various commands and modes.

In an example embodiment, the memory device 100 may receive the deep-sleep mode enter command DSM in the idle state IDLE, and may enter the deep-sleep mode. Even in this case, as in the above description, the memory device 100 may operate by using the decreased voltage (e.g., the second voltage VDD2L) until receiving the self-refresh mode exit command SRX.

Figure 8:
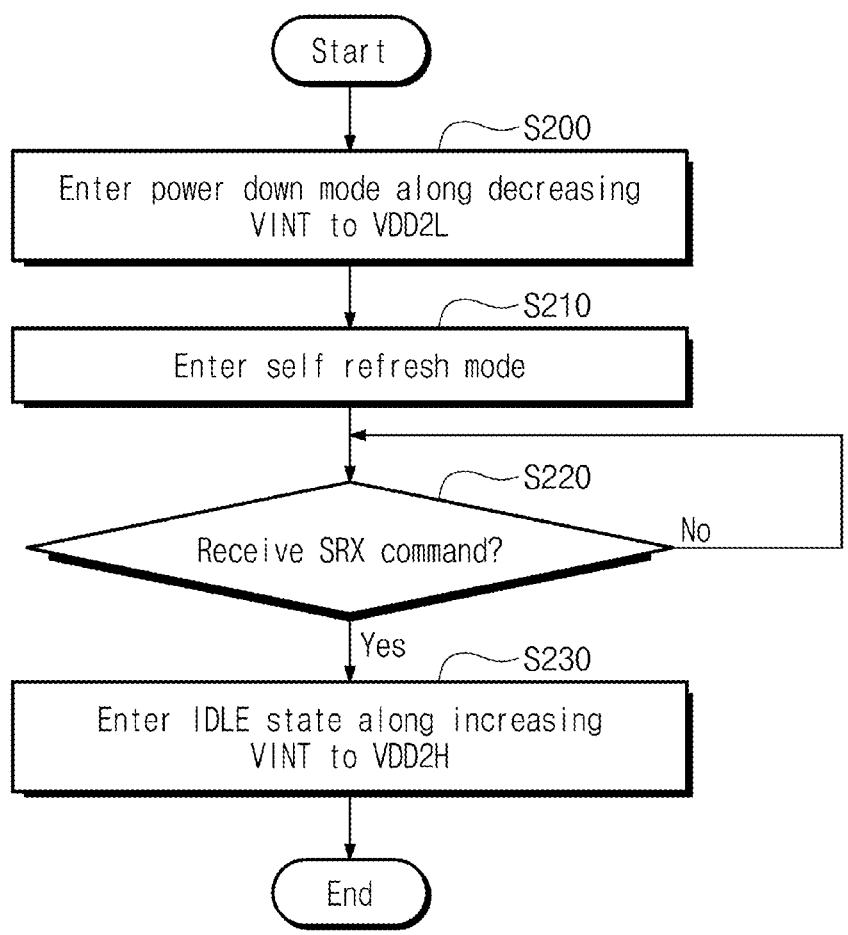
FIG. 8 is a flowchart illustrating an operation method according to another embodiment of a memory device of FIG. 2.

FIG. 8 is a flowchart illustrating an operation method according to another embodiment of a memory device of FIG. 2.

To make explanation short and clear, it is assumed that the flowchart of FIG. 8 starts in the case where the memory device 100 of FIG. 2 is operating in the idle state IDLE or the self-refresh mode.

In operation S200, the memory device 100 may enter the power-down mode while decreasing the internal voltage VINT from the first voltage VDD2H to the second voltage VDD2L. For example, the memory device 100 may enter the power-down mode when receiving the power-down self-refresh mode enter command "SRE with PD" in the idle state IDLE, or when receiving the power-down mode enter command PDE in the self-refresh mode. In this case, the control logic circuit 150 may activate the voltage reduction request signal VDD2L_EN that is provided to the power supply circuit 170. In response to the voltage reduction request signal VDD2L_EN being activated, the power supply circuit 170 may change the internal voltage VINT of the memory device 100 from the first voltage VDD2H to the second voltage VDD2L.

Operation S210 to operation S230 are substantially the same as or similar to operation S140 to operation S160 described with reference to FIG. 5, and thus, additional description will be omitted to avoid redundancy.

Figure 9:
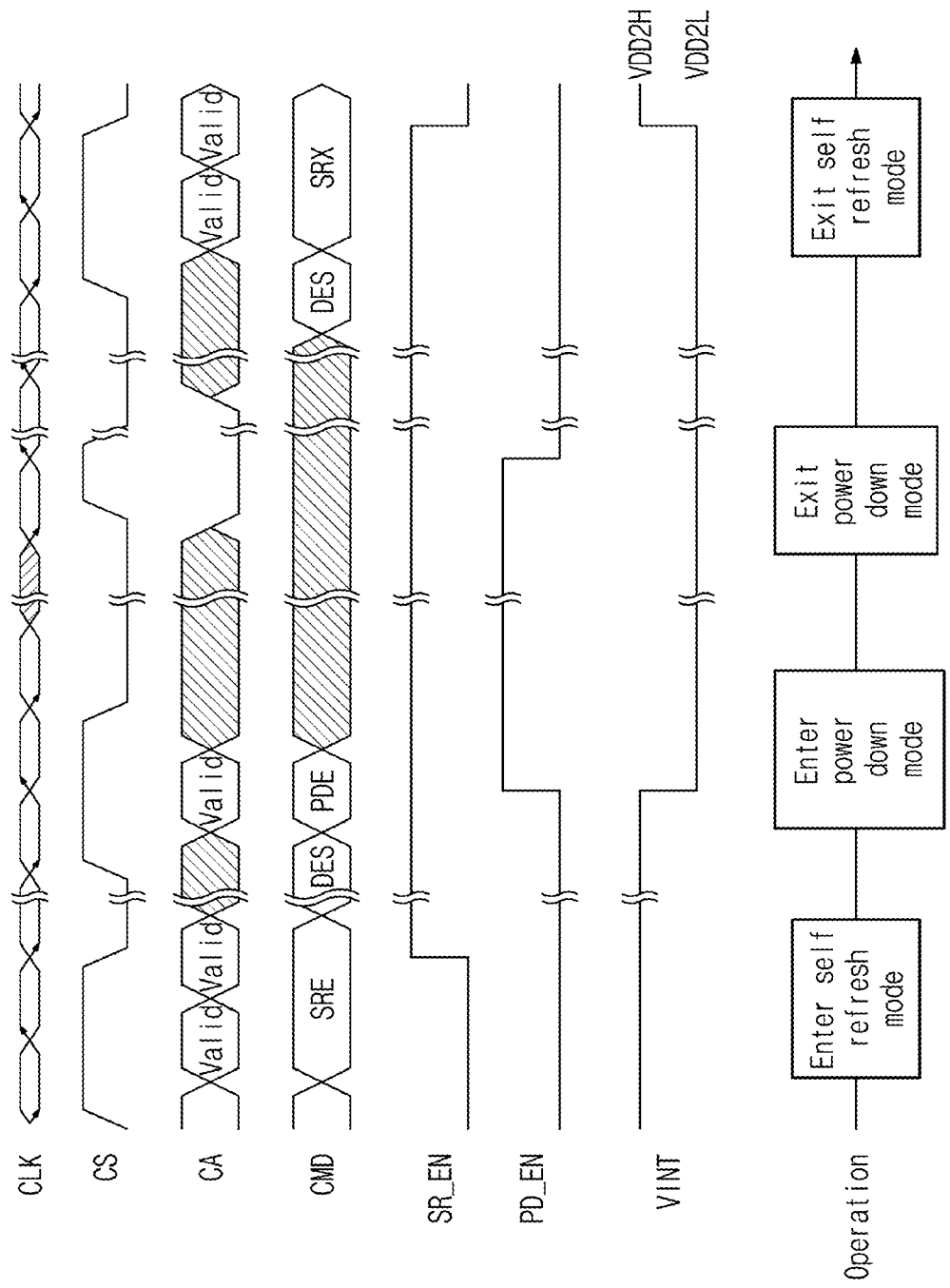
FIG. 9 is a timing diagram for describing an operation of a memory device described with reference to FIG. 8.

FIG. 9 is a timing diagram for describing an operation of a memory device described with reference to FIG. 8.

Below, an operation of the memory device 100 in which the internal voltage VINT decreases as entering the power-down mode will be described with reference to FIGS. 2, 4, and 9 (as compared to the above description of FIG. 7, in which the internal voltage VINT decreases with deep-sleep mode enter command DSM).

Referring to FIG. 9, the memory device 100 may enter the self-refresh mode in response to the self-refresh mode enter command SRE from the memory controller 11. An operation that the memory device 100 performs in response to the self-refresh mode enter command SRE may be similar to that described with reference to FIG. 7, and thus, additional description will be omitted to avoid redundancy.

Referring to FIG. 9, the memory device 100 in the self-refresh mode may receive the power-down mode enter command PDE from the memory controller 11, and may enter the power-down mode. In this case, the control logic circuit 150 may output the power-down mode control signal PD_EN to the power supply circuit 170. The power supply circuit 170 may block the supply of the internal voltage VINT to some of the components of the memory device 100 in response to the power-down mode control signal PD_EN.

In an example embodiment, the control logic circuit 150 of the memory device 100 may activate the voltage reduction request signal VDD2L_EN, which is provided to the power supply circuit 170, in response to the received power-down mode enter command PDE. In this case, a magnitude of the internal voltage VINT of the memory device 100 may decrease. For example, in response to the voltage reduction request signal VDD2L_EN being activated, the power supply circuit 170 may decrease a magnitude of the internal voltage VINT of the memory device 100 from the first voltage VDD2H to the second voltage VDD2L.

In an example embodiment, instead of entering the power-down mode in the idle state IDLE, the memory device 100 may enter the power-down mode in response to the power-down self-refresh mode enter command "SRE with PD" received in the idle state IDLE. Even in this case, as in the above operation performed in response to the power-down mode enter command PDE, the memory device 100 may operate in a state where the internal voltage VINT is decreased from the first voltage VDD2H to the second voltage VDD2L.

Afterwards, the memory device 100 in the power-down mode may enter the self-refresh mode in response to the power-down mode exit command PDX. When receiving the self-refresh mode exit command SRX, the memory device 100 in the self-refresh mode may increase the magnitude of the internal voltage VINT to the first voltage VDD2H and may enter the idle state IDLE. Operations that the memory device 100 performs in response to the power-down mode exit command PDX and the self-refresh mode exit command SRX may be similar to those described with reference to FIG. 7, and thus, additional description will be omitted to avoid redundancy.

In an example embodiment, even in the case where the memory device 100 in the idle state IDLE enters the power-down mode in response to the power-down self-refresh mode enter command "SRE with PD", the memory device 100 may operate by using the decreased voltage (e.g., the second voltage VDD2L) until the self-refresh mode exit command SRX is received.

Figure 10:
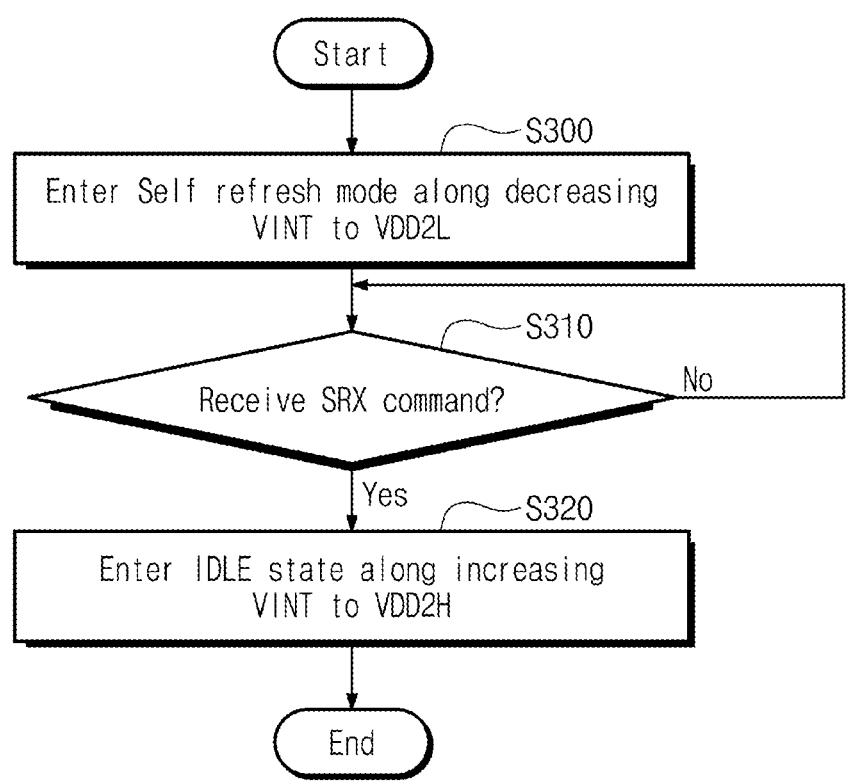
FIG. 10 is a flowchart illustrating an operation method according to another embodiment of a memory device of FIG. 2.

FIG. 10 is a flowchart illustrating an operation method according to another embodiment of a memory device of FIG. 2.

To make explanation short and clear, it is assumed that the flowchart of FIG. 10 starts in the case where the memory device 100 of FIG. 2 is operating in the idle state IDLE.

In operation S300, the memory device 100 may enter the self-refresh mode while decreasing the internal voltage VINT to the second voltage VDD2L. For example, the memory device 100 may receive the self-refresh mode enter command SRE in the idle state IDLE, and may enter the self-refresh mode. In this case, the control logic circuit 150 may activate the voltage reduction request signal VDD2L_EN that is provided to the power supply circuit 170. In response to the voltage reduction request signal VDD2L_EN being activated, the power supply circuit 170 may change the internal voltage VINT of the memory device 100 from the first voltage VDD2H to the second voltage VDD2L.

Operations S310 to S320 may be substantially the same as or similar to operations S150 to S160 described with reference to FIG. 5, and thus, additional description will be omitted to avoid redundancy.

Figure 11:
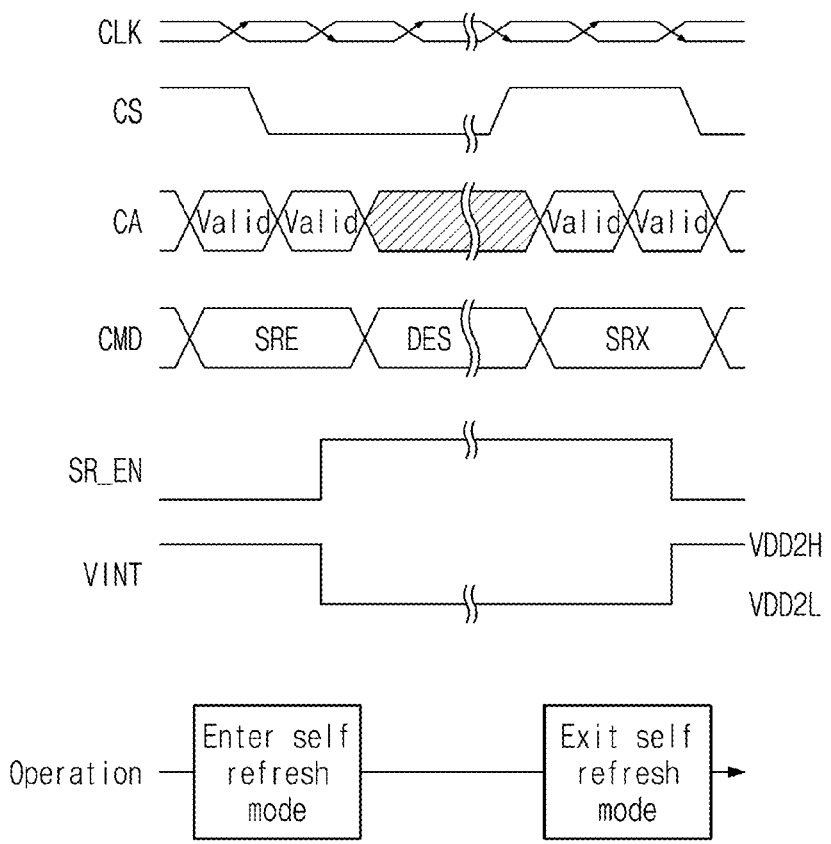
FIG. 11 is a timing diagram for describing an operation of a memory device described with reference to FIG. 10.

FIG. 11 is a timing diagram illustrating an operation method of a memory device described with reference to FIG. 10 in detail.

Below, an operation of the memory device 100 in which the internal voltage VINT decreases entering the self-refresh mode will be described with reference to FIGS. 2, 4, and 11 (as compared to the above description of FIGS. 7 and 9, in which the internal voltage VINT decreases with deep-sleep mode enter command DSM and power-down mode enter command PDE, respectively.).

The memory device 100 may enter the self-refresh mode in response to the self-refresh mode enter command SRE, received from the memory controller 11. In this case, in response to the self-refresh mode enter command SRE, the control logic circuit 150 of the memory device 100 may output the self-refresh control signal SR_EN to the self-refresh logic circuit 160, and may activate the voltage reduction request signal VDD2L_EN that is provided to the power supply circuit 170. In response to the voltage reduction request signal VDD2L_EN being activated, the power supply circuit 170 may decrease a magnitude of the internal voltage VINT of the memory device 100 from the first voltage VDD2H to the second voltage VDD2L.

In an example embodiment, the memory device 100 may maintain the magnitude of the internal voltage VINT at the second voltage VDD2L. For example, until the self-refresh mode exit command SRX is received, the memory device 100 may enter the power-down mode when receiving the power-down mode enter command PDE, and may enter the deep-sleep mode when again receiving the deep-sleep mode enter command DSM. In this case, an operation of the memory device 100 may be performed in a state where the magnitude of the internal voltage VINT is maintained at the second voltage VDD2L.

When receiving the self-refresh mode exit command SRX, the memory device 100 in the self-refresh mode may increase the magnitude of the internal voltage VINT to the first voltage VDD2H, and may enter the idle state IDLE. An operation that the memory device 100 performs in response to the self-refresh mode exit command SRX may be similar to that described with reference to FIG. 7, and thus, additional description will be omitted to avoid redundancy.

As described above, embodiments may provide a memory device capable of reducing power consumption in a self-refresh operation, and an operation method thereof. Embodiments may provide a memory device in which power consumption and heat are reduced, and an operation method thereof.

Example embodiments have been disclosed herein, and although specific terms are employed, they are used and are to be interpreted in a generic and descriptive sense only and not for purpose of limitation. Components that are described in the detailed description with reference to the terms "circuit", "block", etc. may be implemented with software, hardware, or a combination thereof. The software may be, e.g., a machine code, firmware, an embedded code, and application software. The hardware may include, e.g., an electrical circuit, an electronic circuit, a processor, a computer, integrated circuit cores, a pressure sensor, a micro electro mechanical system (MEMS), a passive element, or a combination thereof. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An operation method of a memory device which performs a self-refresh operation, the method comprising:
generating and sending a deep-sleep mode enter command signal from a memory controller to the memory device to place the memory device into a deep-sleep mode while the memory device is operating in a self-refresh mode;
changing a magnitude of an internal voltage of the memory device from a first voltage to a second voltage that is smaller than the first voltage, in response to the deep-sleep mode enter command signal; and
entering the self-refresh mode under control of the memory controller, wherein
the internal voltage is maintained at the second voltage during the self-refresh mode.

2. The method as claimed in claim 1, further comprising:
receiving a self-refresh mode exit command signal from the memory controller; and
changing the magnitude of the internal voltage of the memory device from the second voltage to the first voltage, in response to the self-refresh mode exit command signal.

3. The method as claimed in claim 1, wherein the generating and sending of the deep-sleep mode enter command signal is performed while the memory device is in an idle state.

4. The method as claimed in claim 1, further comprising receiving the deep-sleep mode enter command signal or a power-down mode enter command signal from the memory controller after entering the self-refresh mode.

5. The method as claimed in claim 1, wherein the first voltage and the second voltage are received through different power lines from outside of the memory device.

6. The method as claimed in claim 1, wherein the memory device is a dynamic random access memory (DRAM) device.

7. The method as claimed in claim 6, wherein the first voltage and the second voltage are used in a dynamic voltage and frequency scaling core (DVFSC) mode of the memory device.

8. The method as claimed in claim 7, wherein
the first voltage has a level of 1.05 V, and
the second voltage has a level of 0.9 V.

9. An operation method of a memory device which performs a self-refresh operation, the method comprising:
receiving a self-refresh mode enter command signal from a memory controller;
in response to the self-refresh mode enter command signal, entering a self-refresh mode and changing a magnitude of an internal voltage of the memory device from a first voltage to a second voltage that is smaller than the first voltage while the memory device is not in a deep-sleep mode and is operating in the self-refresh mode;
receiving a self-refresh mode exit command signal from the memory controller; and
changing the magnitude of the internal voltage of the memory device from the second voltage to the first voltage, in response to the self-refresh mode exit command signal, wherein the internal voltage is maintained at the second voltage during the self-refresh mode.

10. The method as claimed in claim 9, wherein the first voltage and the second voltage are received through different power lines from outside of the memory device.

11. The method as claimed in claim 10, wherein
the first voltage has a level of 1.05 V, and
the second voltage has a level of 0.9 V.

12. A memory device, comprising:
a memory cell array including a plurality of memory cells;
a control logic circuit configured to activate a voltage reduction request signal in response to a deep-sleep mode enter command signal received from an external device while the memory device is not in a deep-sleep mode and is operating in a self-refresh mode;
a power supply circuit configured to change an internal voltage from a first voltage to a second voltage, smaller than the first voltage, in response to the activated voltage reduction request signal; and
a self-refresh logic circuit configured to control the self-refresh operation on the memory cells based on the internal voltage of the second voltage.

13. The memory device as claimed in claim 12, wherein the control logic circuit is further configured to deactivate the voltage reduction request signal in response to a self-refresh mode exit command signal received from the external device.

14. The memory device as claimed in claim 13, wherein the power supply circuit is further configured to change a magnitude of the internal voltage from the second voltage to the first voltage in response to the deactivated voltage reduction request signal.

15. The memory device as claimed in claim 12, wherein the first voltage and the second voltage are used to implement a dynamic voltage and frequency scaling core (DVFSC) mode.

16. The memory device as claimed in claim 12, wherein the power supply circuit is further configured to receive the first voltage and the second voltage from outside of the memory device through different power lines.

17. The memory device as claimed in claim 12, wherein the control logic circuit receives the deep-sleep mode enter command signal while the memory device is in an idle state.

18. The memory device as claimed in claim 12, wherein the memory device is a dynamic random access memory (DRAM) device.

* * * * *